Dec. 14, 1954   L. J. CRONIN   2,696,652
QUARTZ ARTICLE AND METHOD FOR FABRICATING IT
Filed July 25, 1951

INVENTOR
LEO J. CRONIN
BY
ATTORNEY

2,696,652

QUARTZ ARTICLE AND METHOD FOR FABRICATING IT

Leo J. Cronin, Natick, Mass., assignor to Raytheon Manufacturing Company, Newton, Mass., a corporation of Delaware Application July 25, 1951, Serial No. 238,544

6 Claims. (Cl. 25—157)

This invention relates to articles made of quartz including quartz-to-metal seals and methods for fabricating them.

Quartz is known to be very difficult to work because of its great hardness, high melting point, and viscosity. Its relatively small linear coefficient of expansion, $0.42 \times 10^{-6}$ cms./cm./degree C., as compared with that of a metal makes it difficult to join it to metal with a vacuum tight seal. For instance, molybdenum has one of the lowest coefficients of expansion for a metal, $4.9 \times 10^{-6}$ cms./cm./degree C., more than ten times as great. Where the completed seal is to be used at high temperatures it has been customary to make a succession of seals between the quartz and various glasses having successively higher coefficients of expansion to prevent strains developing. At the lower operating temperatures, cements and other mechanical adhesives have been used.

The extreme hardness of quartz has made it impossible to form except by grinding, a time-consuming and expensive process, or melting, where its high melting point, 1470 degrees C., and great viscosity make it difficult to work with; yet the properties of quartz make it highly desirable in certain applications, such as vacuum tubes operating at high temperatures.

By the present invention, quartz is easily formed into desired shapes and joined to metal by compressing it in a die in powdered form, and then subjecting it to a temperature in excess of its melting point in a reducing atmosphere. If it is desired to seal the quartz to metal, the die cavity is lined with a paste formed with a metal powder and a binder. The finished quartz form has a layer of metal that is thoroughly bonded to the quartz. Standard soldering techniques may be used to join the bonded metallic layer to other pieces of metal to form a vacuum tight seal.

In certain vacuum tube applications it is desirable to have a quartz insulator that is porous for ease in degassing. If the powdered quartz is not held at a temperature above its melting point long enough for the particles to fuse into a solid mass, the particles will be bound together but there will be spaces between particles, resulting in a porous mass from which any gases absorbed may be easily removed.

Other and further advantages of this invention will be apparent as the description thereof progresses, reference being had to the accompanying drawings, wherein.

Figure 1:
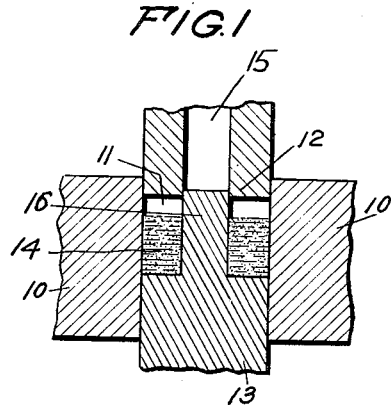
Fig. 1 is a section through a die cavity shown filled with quartz powder.

In Fig. 1, the reference numeral 10 indicates the walls of a die cavity 11 into which a punch 12 is adapted to be pressed downward toward an anvil 13. The cavity 11 is filled with powdered quartz 14. In the example shown, the cavity 11 is cylindrical in shape and the die 12 is formed with a hole 15 dimensioned to receive a cylindrical protrusion 16 formed on the anvil 13 so dimensioned that, when the die 12 and anvil 13 are pressed together in the position shown in Fig. 2, the quartz is pressed into an annular shape 17 shown in Fig. 3 with a central hole 18. The compressed powdered quartz ring 17 is then heated to a temperature of 1800 degrees C. in a hydrogen atmosphere for fifteen minutes, and, when this ring 17 is permitted to cool, it forms a solid mass of fused quartz in the desired shape.

Any shape that can be pressed down with a die can be made by this process. The shape will depend upon the configuration of the die 12 and anvil 13.

Figure 4:
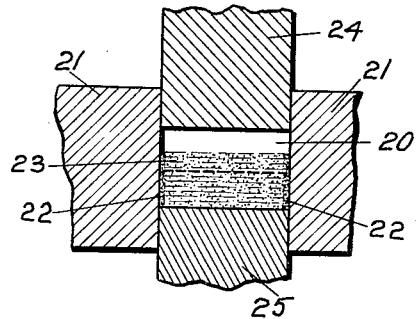
Fig. 4 is a view of a die cavity coated with metallic powder and filled with quartz powder.
Figure 2:
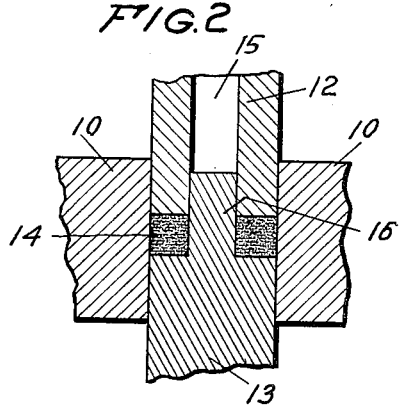
Fig. 2 is a section through the die cavity of Fig. 1 after pressure has been applied.
Figure 5:
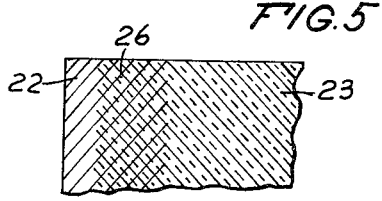
Fig. 5 is an enlarged section of a part of one metal coated edge of a quartz piece formed in the die of Fig. 4.
Figure 3:
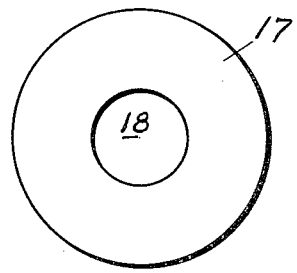
Fig. 3 is a view of the fabricated quartz piece formed in the die of Figs. 1 and 2.

Figs. 4 and 5 show how a bonded layer of metal may be added to a piece of quartz fabricated according to the method shown in Figs. 1 and 2. By this method a die cavity 20 formed in a piece of metal 21 is lined with a paste 22 made of powdered metal and a binder, such as nitrocellulose. Sufficient quartz powder 23 is then inserted into the cavity 20 to form the quartz disk. When the punch 24, formed in any desired shape, in this case a cylinder, is pressed down toward the anvil 25, it compacts the powdered quartz 23 and powdered metal paste 22 into a compact mass. As may be seen in Fig. 5, the compacted metal powder penetrates into the quartz powder 23 to form a region 26 of mixed metal and quartz powder which, when heated to a temperature above the melting point of quartz, preferably 1800 degrees C. for fifteen minutes in a reducing atmosphere, such as hydrogen, forms a vacuum tight bond to the metallic layer 22 to which other metallic pieces may be affixed by conventional methods, such as soldering, to give a vacuum tight quartz-to-metal seal without the complexity and expense of a series of graded seals.

If after the quartz powder is formed into the desired shape in the die cavity 11 it is heated to the melting point but not held there too long, the quartz particles will soften but will not completely melt. The softened quartz particles will join at their points of contact to form a spongelike porous mass of quartz. Where metal parts are to be separated, both physically and electrically, within an evacuated envelope, such a porous insulator is useful as the quartz in this form may be more rapidly degassed of any gases it may have absorbed than a solid piece of fused quartz.

Figure 6:
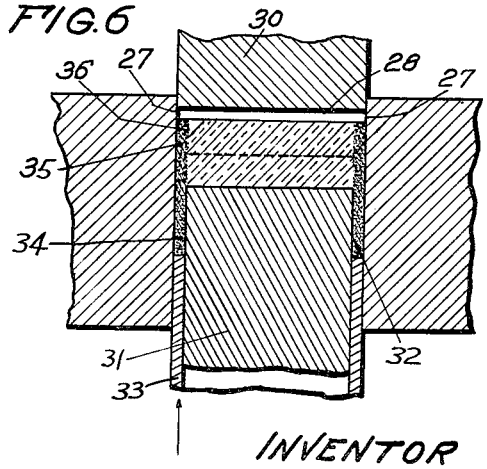
Fig. 6 is a sectional view of a modified die arranged to form a disk of quartz sealed within a sleeve of metal.

In some applications it may be useful to form a piece of quartz within a sleeve of metal. By the process of this invention, the quartz piece and sleeve may be formed together in a die of the type shown in Fig. 6. The wall 27 of the die cavity 28 and the punch 30 may be designed in much the same manner as those shown in Fig. 4. However, the anvil 31 is reduced in diameter by the desired thickness of the sleeve to leave a groove 32 between it and the walls 27. A sleeve 33 is fitted about the anvil 31 and means are provided to force it up against the punch 30. The upper portion of the groove 32 is filled with powdered metal 34 and the walls 27 are coated with a powdered metal paste 35 of the same type as that described in connection with Fig. 4. The remainder of the cavity 28 contains the powdered quartz 36. When the punch 30 is brought down toward the anvil 31 and the sleeve 33 upward toward the punch 30, the powdered metal 34 is compressed in the groove 32 while the powdered quartz 36 and the powdered metal paste 35 are compressed into a disk, such as that shown in Fig. 5, with the metal paste 35 extending down in a sleeve. The article is completed by the heat treatment described above.

What has been referred to above as quartz is intended to include all the physical forms of silicon dioxide, such as cristobalite, tridymite and amorphous silica.

The process described can also be used to form articles of high melting point glasses, such as those known as Vycor.

This invention is not limited to the particular details of construction, materials and processes described, as many equivalents will suggest themselves to those skilled in the art.

What is claimed is:

1. A method for fabricating quartz articles with a metallic coating comprising the steps of forming the desired article of quartz powder under pressure in a die cavity coated with a paste formed of molybdenum powder and heating the formed article at a temperature above the melting point of quartz to form a quartz article with a firmly bonded metallic coating.

2. A method for fabricating quartz articles with a metallic coating comprising the steps of forming the desired article of quartz powder under pressure in a die cavity coated with a paste formed of molybdenum powder and heating the formed article at a temperature of 1800 degrees C. for fifteen minutes to form a quartz article with a firmly bonded metallic coating.

3. A method for fabricating quartz articles with a metallic coating comprising the steps of forming the desired article of quartz powder under pressure in a die cavity coated with a paste formed of molybdenum powder and heating the formed article at a temperature of 1800 degrees C. in a reducing atmosphere for fifteen minutes to form a quartz article with a firmly bonded metallic coating.

4. A method for fabricating quartz articles with a metallic coating comprising the steps of forming the desired article of quartz powder under pressure in a die cavity coated with a paste formed of molybdenum powder and heating the formed article at a temperature of 1800 degrees C. in an atmosphere of hydrogen for fifteen minutes to form a quartz article with a firmly bonded metallic coating.

5. A method for fabricating quartz articles bonded to a molybdenum sleeve comprising the steps of filling an annular groove in a die cavity with molybdenum powder and coating the walls of the cavity with a paste comprising a molybdenum powder and a binder, filling the cavity with finely divided quartz, applying pressure and heating the resulting compacted mass to the melting point of quartz in a reducing atmosphere to form a body of quartz with a sleeve bonded about its edges with a vacuum tight seal.

6. An article of manufacture comprising a body of fused quartz mounted inside a sleeve of molybdenum with a mixture of fused quartz and molybdenum particles in the region of contact between the fused quartz and molybdenum forming a gradual transition between the two materials.

References Cited in the file of this patent

UNITED STATES PATENTS

| Number | Name | Date |
|---|---|---|
| 991,743 | Osborn et al. | May 9, 1911 |
| 1,155,358 | Hulbert | Oct. 5, 1915 |
| 1,536,821 | Devers | May 5, 1925 |
| 1,546,266 | Thompson et al. | July 14, 1925 |
| 1,549,597 | Miller | Aug. 11, 1925 |
| 1,669,362 | Watson | May 8, 1928 |
| 1,987,969 | Parkin | Jan. 15, 1935 |
| 2,038,627 | Badger | Apr. 28, 1936 |
| 2,265,352 | Corbin et al. | Dec. 9, 1941 |
| 2,268,589 | Heany | Jan. 6, 1942 |
| 2,270,718 | Spauky et al. | Jan. 20, 1942 |
| 2,431,660 | Gaudenzi | Nov. 25, 1947 |